US009513175B2

(12) United States Patent
Prendergast et al.

(10) Patent No.: US 9,513,175 B2
(45) Date of Patent: Dec. 6, 2016

(54) APPARATUS AND METHOD FOR DETECTING HIGH-ENERGY RADIATION

(71) Applicant: RADIATION WATCH LIMITED, East Cowes, Isle of Wight (GB)

(72) Inventors: David Prendergast, East Cowes (GB); Michael Anderson, East Cowes (GB); Paul Downes, East Cowes (GB); William Croydon, East Cowes (GB); Christopher Boyce, East Cowes (GB); Wayne Cranwell, East Cowes (GB); Trevor McAlister, East Cowes (GB); Zhuo Zhhang, East Cowes (GB)

(73) Assignee: RADIATION WATCH LIMITED, East Cowes, Isle of Wight (GB)

( * ) Notice: Subject to any disclaimer, the term of this patent is extended or adjusted under 35 U.S.C. 154(b) by 0 days.

(21) Appl. No.: 15/172,584

(22) Filed: Jun. 3, 2016

(65) Prior Publication Data
US 2016/0313456 A1 Oct. 27, 2016

Related U.S. Application Data

(63) Continuation of application No. 14/266,581, filed on Apr. 30, 2014, now abandoned, which is a
(Continued)

(30) Foreign Application Priority Data

Jun. 12, 2006 (GB) .................................. 0611621.4
Jun. 12, 2006 (GB) .................................. 0611623.0

(51) Int. Cl.
*G01T 1/24* (2006.01)
*G01K 17/00* (2006.01)

(52) U.S. Cl.
CPC ................. *G01K 17/00* (2013.01); *G01T 1/24* (2013.01)

(58) Field of Classification Search
CPC .................................. G01T 1/24; G01K 17/00
See application file for complete search history.

(56) References Cited

U.S. PATENT DOCUMENTS

2002/0195567 A1  12/2002  Ducourant
2003/0111674 A1   6/2003  Fossum
(Continued)

FOREIGN PATENT DOCUMENTS

DE   196 15 178 A1   10/1997
JP   09 257938        10/1997

OTHER PUBLICATIONS

Barrett et al., "Charge transport in arrays of semiconductor gamma-ray detectors," Phys. Rev. Lett., 1995, vol. 75, Issue 1, pp. 156-159.
(Continued)

*Primary Examiner* — Marcus Taningco
*Assistant Examiner* — Faye Boosalis
(74) *Attorney, Agent, or Firm* — Knobbe, Martens, Olson & Bear LLP

(57) ABSTRACT

An apparatus for spatially correcting an image frame is disclosed. In some embodiments, the apparatus stores a frame of pixel values and scans a multi-pixel correction window across the frame. Spatial correction is performed on pixels within the window at correction positions during the scan. The spatial correction comprises estimating pixel values at value estimation positions based on one or more pixel values within the window for pixels satisfying a logical condition. The value estimation positions correspond to pixel values which do not fall within the window again during the scan. Further disclosed is an apparatus for detecting high-energy radiation, in which integration circuitry is used for integrating charge responsive to radiation photon interaction events. The circuits are controllable in accor-
(Continued)

dance with an exposure control signal to vary an exposure window duration according to an operating parameter of the apparatus.

8 Claims, 9 Drawing Sheets

Related U.S. Application Data continuation of application No. 12/692,448, filed on Jan. 22, 2010, now abandoned, which is a continuation of application No. 12/304,755, filed as application No. PCT/GB2007/002152 on Jun. 12, 2007, now abandoned.

(56) References Cited

U.S. PATENT DOCUMENTS

2004/0028182 A1 2/2004 Tamegai
2004/0094720 A1 5/2004 Dagan et al.

OTHER PUBLICATIONS

Eskin et al., "Signals induced in semiconductor gamma-ray imaging detectors," J. Appl. Phys., 1999, vol. 85, pp. 647-659.

Heikkinen et al., "Modeling a Poisson forest in variable elevations: a nonparametric Bayesian approach," Biometrics, 1999, vol. 55, Issue 3, pp. 738-745.

International Search Report issued Jan. 28, 2009, International Appl. No. PCT/GB2007/002152, 4 pages.

Johnson et al., "Applied multivariate statistical analysis," 2007, New Jersey Prentice Hall, pp. 149-272.

Knoll, Glen, Radiation Detection and Measurement, John Wiley & Sons, Inc., 1999. 3 pages.

Press et al., "Numerical recipes in C: The art of scientific computing," 1986, Cambridge University Press, 1 page.

Rumelhart et al., "Learning internal representations by error propagation," Sep. 1985, Parallel Distributed Processing: Exploration in the Microstructure of Cognition. vol. 1: Foundations, Cambridge, MA, MIT Press. 49 pages.

(d)

Tri-pixel cases

| (i) | Triggers (b<>0 and c<>0) |
| (ii) | Triggers (a<>0) |
| (iii) | Triggers (a<>0) |
| (iv) | Triggers (a<>0) and ((b<>0 and c<>0)) |

All cases will result in, (e)

Quad-pixel case

Triggers (a<>0) and ((b<>0 and c<>0)), which results in->

(f)

APPARATUS AND METHOD FOR DETECTING HIGH-ENERGY RADIATION

RELATED APPLICATIONS

This application is a continuation of U.S. application Ser. No. 14/266,581, filed Apr. 30, 2014, which is a continuation of U.S. application Ser. No. 12/692,448, filed Jan. 22, 2010, which is a continuation of U.S. application Ser. No. 12/304, 755, filed Dec. 12, 2008, which is a National Phase Application of PCT/GB2007/002152, filed Jun. 12, 2007, which was published in English and designated the U.S., and claims priority to GB 0611623.0, filed Jun. 12, 2006 and to GB 0611621.4, filed Jun. 12, 2006, all of which are incorporated herein by reference.

FIELD

The present invention relates to a high-energy radiation detector apparatus and method of operation. In particular, but not exclusively to high-energy radiation detector apparatus configured to adjust an exposure window duration of the apparatus dependent on one or more operating parameters of the apparatus, and also to apparatus configured to carry out spatial correction of an image frame.

BACKGROUND

In general ionising radiation is considered to be radiation within the energy range 5 KeV to 6 MeV and includes gamma rays, x-rays, beta-rays, alpha-rays and neutron beams. Devices for detecting ionising radiation are well-known for radiological protection and metrology, such as in health or nuclear physics as well as national/homeland security and anti-terrorist applications. The devices are one of two types, either passive detectors or electronic-based active detectors.

Passive detection systems use film (film-badges), thermo-luminescent detection (TLD) or photochromatic technologies (PC) as detector materials. Common to these detector technologies is that they register the presence of ionising radiation by a change of state. For example, a film exposed to ionising radiation goes dark when developed, TLD materials emit light when heated having previously been exposed to ionising radiation and PC materials change colour when irradiated with ionising radiation. However, the change of state of these materials requires special processing in order to be determined, for example developing the film or heating the TLD material. Consequently, only an historic monitoring and evaluation of radiation exposure can be obtained. It is not possible to achieve real-time monitoring and evaluation. Since no direct real-time monitoring or analysis is possible it is therefore necessary to infer what type of radiation exposure caused the change of state. Although such inference can be drawn based on experience, nevertheless it is not possible to precisely determine what type of radiation (spectroscopic information) has been sensed nor an estimate of radiation dose which takes into account such information. Additionally, known passive detection systems generally have poor sensitivity to ionising radiation.

Active detectors may be based upon silicon technology and generally comprise one, two or three PIN-diodes, each PIN-diode having a preset threshold level to signal an alarm relating to a minimum energy level of incident radiation.

If more than one PIN-diode is used then different threshold levels may be preset corresponding to different radiation and energy levels thereby providing crude spectroscopic analysis of incident radiation. However, silicon has poor sensitivity to ionising radiation since it does not have a high atomic number (Z), therefore there is inefficient conversion of the incident radiation to electric current and devices using such technology suffer from poor signal to noise ratio.

Another drawback of known active detectors is that the electronic signals are generated remote from the detector substrate, leading to signal losses and signal mis-shaping due to the impedance of connecting wires and circuitry.

In order for accurate measurement of absolute values such as the amount of exposure to incident radiation (dose), the rate of that exposure (dose rate) and the type of radiation exposure (radiation isotope) it is important that the charge value collected by an electrode, e.g. each pixel contact pad, is properly representative of the energy of the incident radiation giving rise to a photon-interaction event which generates the charge. However, The Applicant has appreciated that errors may be introduced into the measurement of charge by the very nature of the radiation that is being measured, and not only due to errors and noise in the detectors themselves.

One example is where the radiation is incident at the mid point between two pixels, which is likely, then a photon interaction event may cause charge to propagate towards two adjacent pixels in the same frame. This would be recorded as two separate hits. However, a lower energy hit would be measured than that which actually occurred because the energy of the event has been spread across two pixels rather than one. Note, for the purpose of this description a "hit" means charge collected from a single photon interaction event, plural hits corresponding to plural photon interaction events.

Other examples of causes of error are where:
(a) two hits in the same pixel in a single frame are recorded. This would result in the measurement of a higher energy hit than really occurred since the summation of the two hits within the pixel would look like a single higher energy hit.
(b) two hits in adjacent pixels in the same frame are recorded. This is the effect that "spatial correction" assumes will not happen. Such events are summed together via "spatial correction". An error condition would be present in the presence of two actual adjacent photon hits. Spatial correction would cause a higher energy hit than really occurred to be measured, since the two hits will be combined as though they were two interactions from the same energy hit.
(c) two hits in the same pixel in successive frames cause a problem as they may be separate hits corresponding to separate interaction events. For such a situation, fixed pattern noise removal using frame differencing will result in the difference frame recording the difference in the hits from successive frames, rather than "hit minus no-hit".

Embodiments of the present invention were devised with the foregoing in mind.

SUMMARY

Viewed from a first aspect in accordance with the invention there is provided apparatus for detecting high-energy radiation, comprising a detector substrate for generating charge responsive to high-energy incident radiation, the detector substrate being configured to form an array of high-energy radiation sense volumes; and a circuit substrate supporting an array of read-out circuits corresponding to the array of sense volumes and operative to collect charge from corresponding sense volumes. Each of the read-out circuits include charge integration circuitry for integrating charge responsive to a radiation photon interaction event in a corresponding sense volume. The read-out circuits are automatically controllable in accordance with an exposure control signal to vary an exposure window duration dependent on an operating parameter of said apparatus. Each read-out circuit is coupled to a corresponding pixel contact pad electrode to which charge drifts under influence of a bias applied across the detector substrate, and from which charge is collected by the read-out circuits during the exposure window.

Viewed from a second aspect in accordance with the invention there is provided a method for controlling an exposure window duration for a high-energy radiation detector including read-out circuitry for collecting charge generated by a photon interaction event in a detector substrate. The method comprises automatically controlling the read-out circuitry to collect charge over an exposure window having a duration dependent on an operating parameter of said detector.

By controlling the timing of the read-out circuits, the exposure window for which charge is being accumulated for each pixel may be controlled and the number of photon interaction events likely to detected during an exposure can be controlled.

For a given incident radiation flux level, the likelihood of occurrence of the error inducing events described above in paragraphs (a), (b) and (c) may be reduced by reducing the exposure window duration, i.e. the duration over which the charge from each pixel contact electrode is collected. Furthermore, by reducing the likelihood of type (b) events, the accuracy of spatial correction for charge shared events may be improved.

In a particular embodiment, the exposure control signal is dependent on the number of photon interaction events detected by the apparatus in a given time period. For example, a current exposure time for the apparatus. Thus, the number of photon interaction events ("hits") recorded for each frame of data may be controlled and maintained at a substantially constant level independent of the radiation flux level incident on the detector substrate. Thus, not only may the source of errors be reduced, but also the likelihood of charge saturation of circuitry due to high flux levels may also be reduced.

Suitably, the exposure control signal is configured to decrease the exposure window duration for an increase in the number of photon interaction events detected by the apparatus in the given time period. Additionally, the exposure window may be increased for a decrease in the number of photon interaction events detected by the apparatus, which leads to a substantially constant hit level if the flux level decreases.

Optionally or additionally, the exposure control signal is dependent on the temperature of the detector substrate. This allows account to be taken of the increase in charge generation for a photon interaction event of a given energy that occurs with an increase in temperature of the detector substrate.

Thus, exceeding the dynamic range of an analogue to digital converter (ADC) for example due to increased charge generation as a consequence of increased temperature may be avoided by reducing the exposure window duration for increases in temperature.

Suitably, the temperature may be determined by monitoring dark current leakage in the detector substrate which avoids the need for a separate temperature sensor and is directly indicative of the temperature of the detector substrate. Typically, the apparatus comprises signal processing circuitry for configuring the exposure control signal in dependence on the operating parameter.

The signal processing circuitry may comprise calibration data for modifying a charge value derived from a read-out circuit in correspondence with a change in the temperature of said detector substrate. The calibration data compensates for changes in the amount of charge that is generated by the detector substrate according to temperature in order to maintain a substantially constant charge value level for a photon interaction event independent of the temperature of the detector substrate.

Viewed from a third aspect of the invention there is provided apparatus for spatially correcting an image frame comprising an array of pixel values. The apparatus is configured to store a frame of pixel values and scan a multi-pixel correction window across the frame of pixel values and carry out spatial correcting on pixels values within the window at correction positions during the scan. The spatial correcting comprises estimating a pixel value at a value estimation position within the window at a correction position based on one or more pixels values within the window for pixel values within said window satisfying a logical condition; and the value estimation position corresponds to a pixel value in the frame which will not fall within the correction window again during the scan of the frame.

Viewed from a fourth aspect of the invention there is provided a method for spatially correcting an image frame comprising an array of pixel values. The method comprises storing a frame of pixel values; scanning a multi-pixel correction window across the frame of pixel values; and spatially correcting pixels values within the window at correction positions during the scan. The spatially correcting comprises estimating a pixel value at a value estimation position within the window at a correction position based on one or more pixels values within the window for pixel values within the window satisfying a logical condition. The value estimation position corresponds to a pixel value in the frame which will not fall within the window again during the scan of the frame.

Embodiments in accordance with the third and fourth aspect of the invention address the problem of errors arising in considering oblique incidence of radiation by assuming that hits observed in adjacent pixels are caused by a single oblique event. Values measured from the pixels are combined into one higher value representing the single event that occurred. This is known as Spatial Correction and is a mathematical correction based on pixel to pixel geometry.

One embodiment is further configured to provide an estimate of the pixel value at the value estimation position by calculating the sum of the pixel values of all pixels within the window for the logical condition being satisfied, and assigning the sum as the estimate of the pixel value.

Optionally, an embodiment may be configured to provide an estimate of pixel value at the value estimation position by calculating the sum of the pixel values for which a logic condition is true for logical condition being satisfied.

Typically, the array of pixels is a rectangular (which includes square) array which is a common arrangement, but other arrays such hexagonal or other geometry may be used.

One embodiment is configured to scan the window across said frame in a raster pattern which is a common scanning pattern for image arrays. Suitably, one embodiment is configured to scan in steps of one pixel which ensures that all pixels are spatially corrected for.

Since edge pixels are set to have zero value as their charge generation characteristics are adversely affected by the slicing of the detector substrate during manufacture, the correction window will be able to scan over and correct for all pixel values which will contribute to the image frame and are not set to zero due to being at an edge.

Typically, the pixel values are representative of charge collected from a high-energy detector substrate. In particular, the detector substrate is configured to form an array of high-energy radiation sense volumes, and there is further provided a circuit substrate supporting an array of read-out circuits including charge collection electrodes corresponding to the array of sense volumes and operative to collect charge from corresponding sense volumes, each of the read-out circuits including charge integration circuitry for integrating charge responsive to a radiation photon interaction event in a corresponding sense volume. The pixel values correspond to charge collected from corresponding sense volumes.

The charge collection electrodes form a pixellated charge collection substrate forming a corresponding pixellated array of the sense volumes, which can provide a dense high spatial resolution array of sense volumes.

In a particularly suitable embodiment for real-time applications the image frame undergoing spatial correction is itself modified with spatially corrected pixel values. Thus no intermediate spatially corrected result frame is required, and the spatial correction can be carried out as the frame is scanned because the corrected pixel is not used in further corrections. This is in contrast to convolution correction which needs use original pixel values of pixels that have already been corrected, and therefore the original frame has to remain unchanged during the correction process, and a separate corrected frame created. Furthermore, convolutional encoding is computationally more intensive than logical analysis and not so suitable for implementation in a Field Programmable Gate Array for example.

An embodiment in which spatial correction may be performed within the frame undergoing correction itself may achieve spatially correction of an image frame within an exposure window duration for capturing an image frame. Thus, spatial correction may be done in real-time.

One embodiment is configured to carry out procedures for:
 fixed pattern noise removal on an image frame and modifying the image frame to correct for fixed pattern noise;
 pixel gain correction on the noise corrected image frame and modifying the noise corrected image frame to correct for pixel gain;
 threshold filtering on the pixel gain corrected frame and modifying the pixel gain corrected frame in accordance with the threshold filtering; and
 spatially correcting the threshold filtered frame and modifying the threshold filtered frame in accordance with the spatial correcting; wherein the procedures are carried out within an exposure window duration for capturing an image frame.

A particular embodiment is configured to provide a value corresponding to the number of non-zero pixel values in the spatially corrected frame which provides a frame "hit" count.

LIST OF FIGURES

Figure 4:
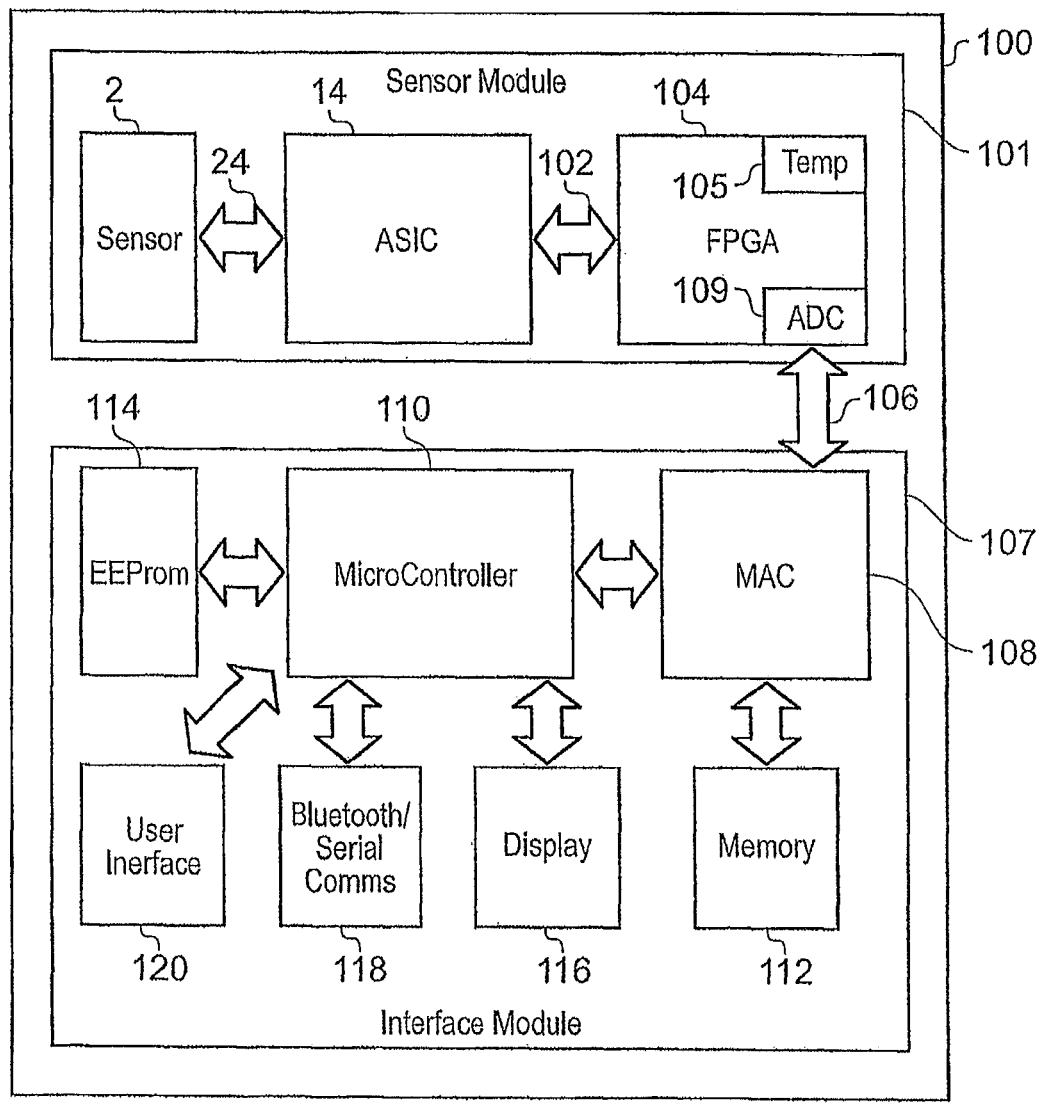
Figure 5:
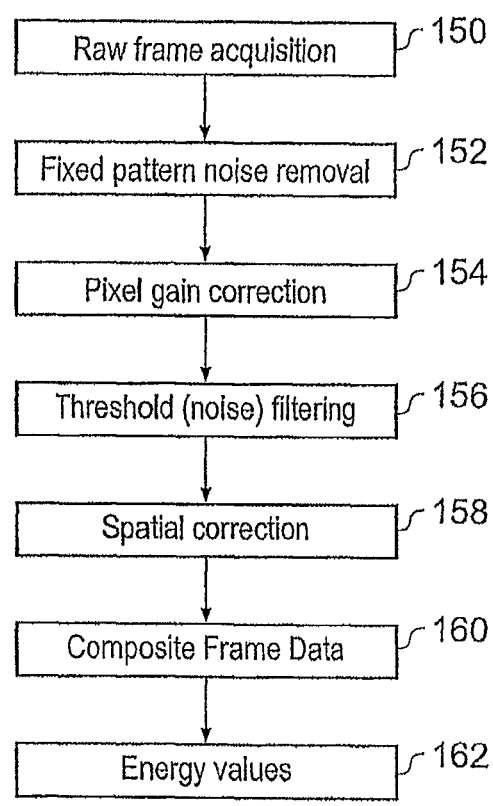
Figure 6:
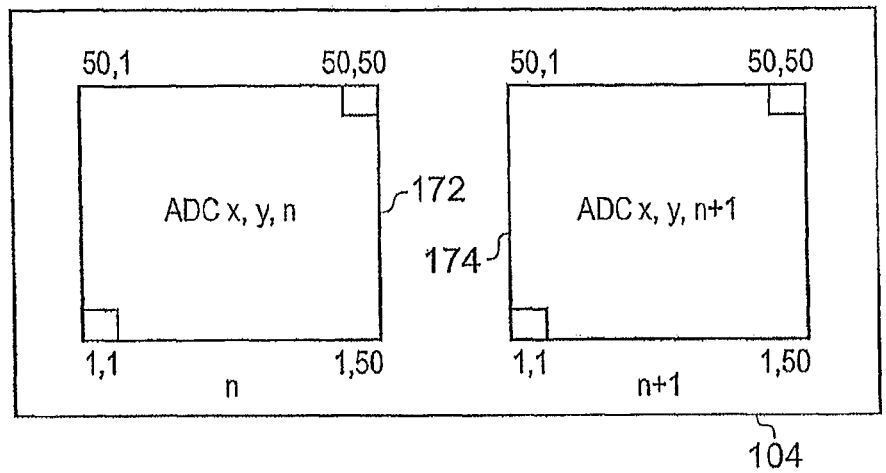
Figure 7:
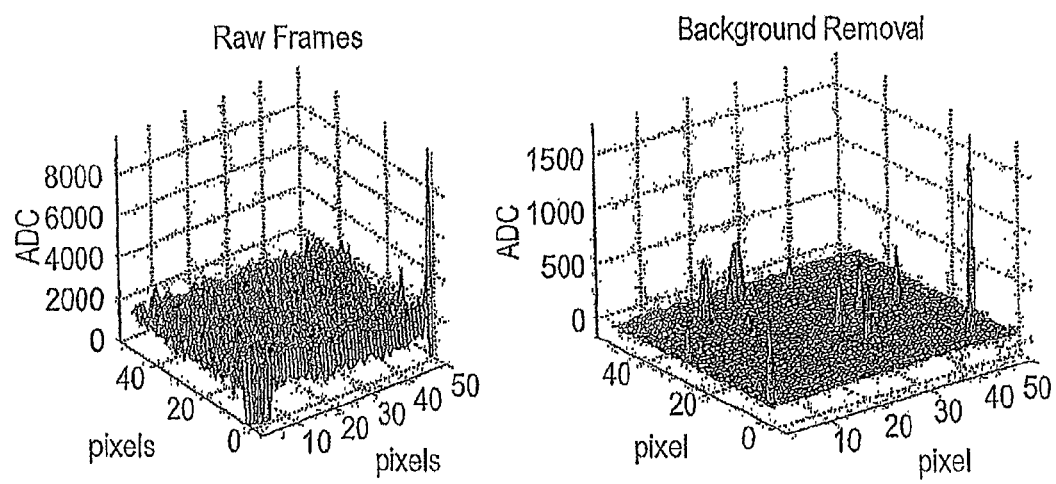
Figure 8:
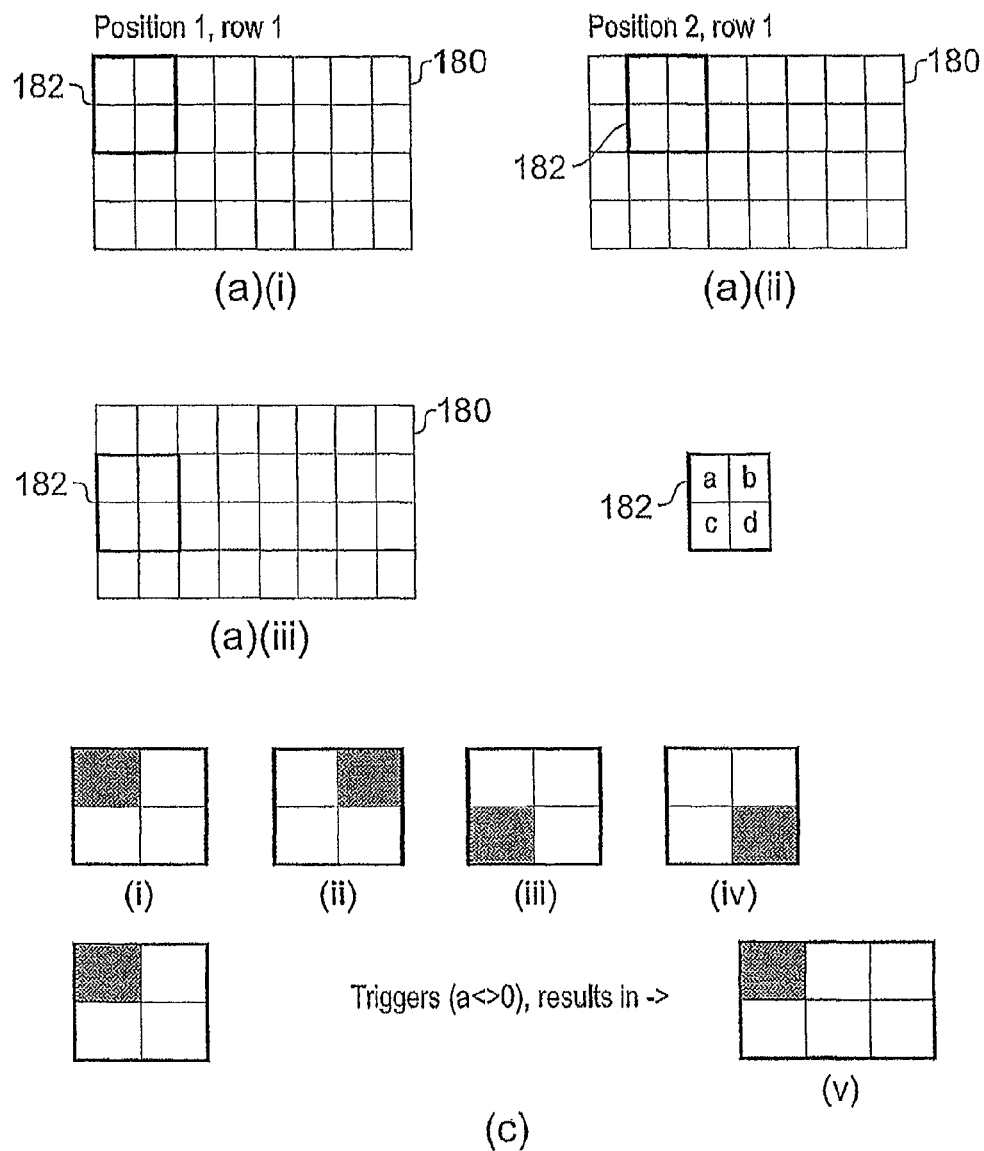
Figure 8:
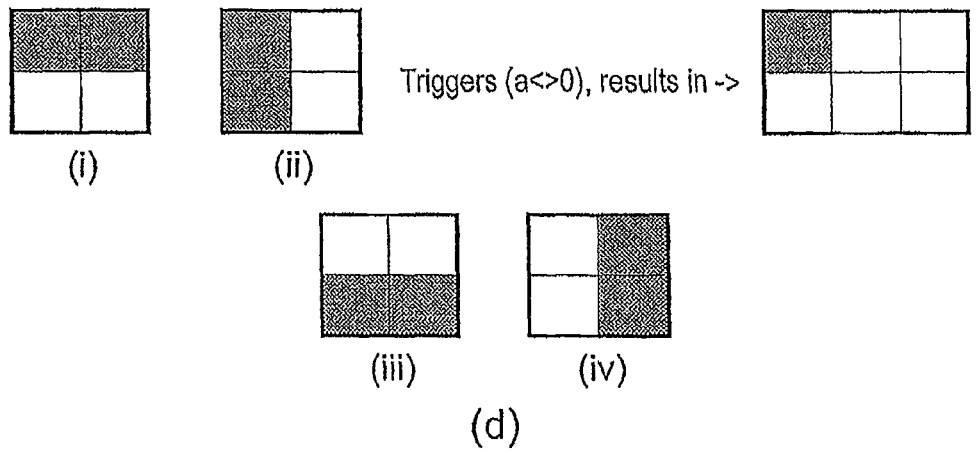
Figure 8:
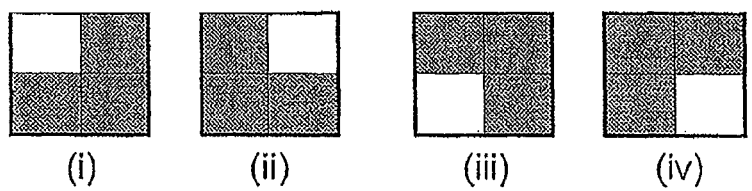
Figure 8:
Figure 8:
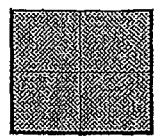
Figure 8:
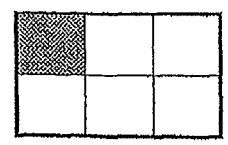
Figure 10:
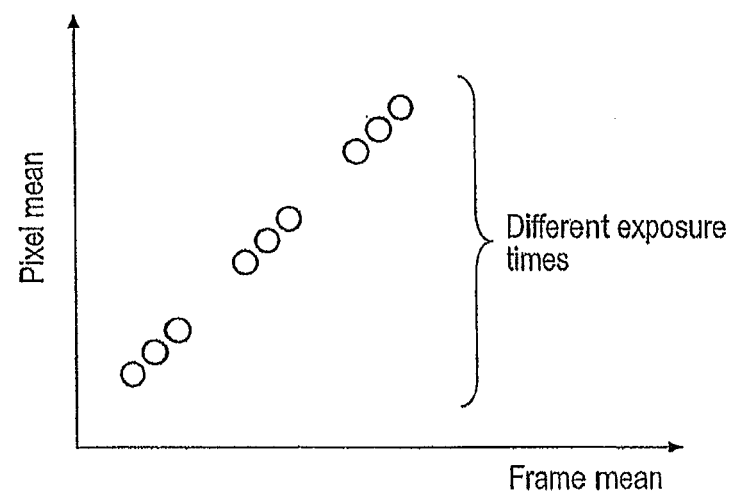
Figure 9:
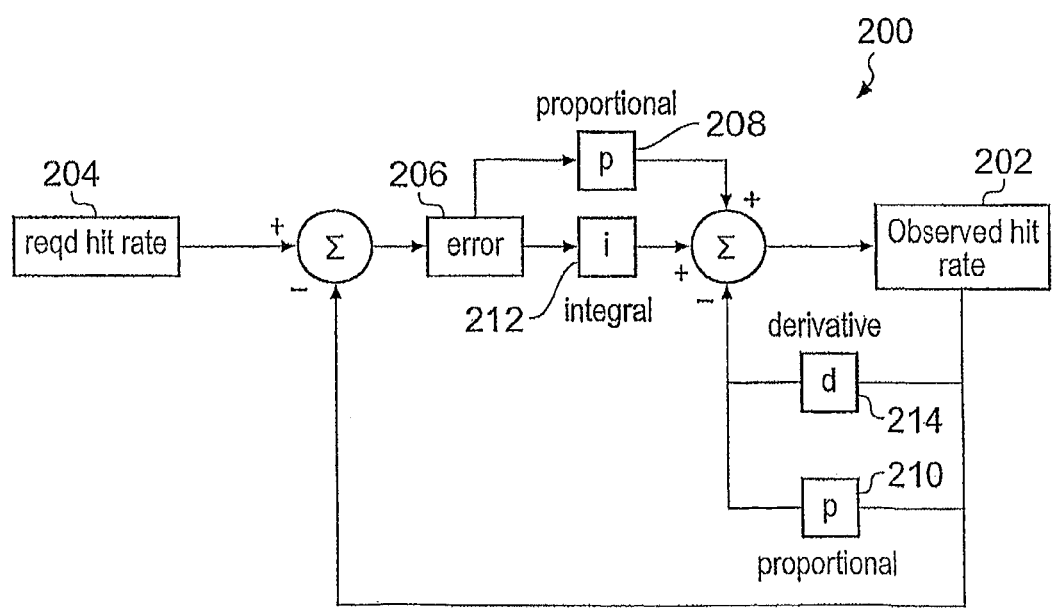
Figure 11:
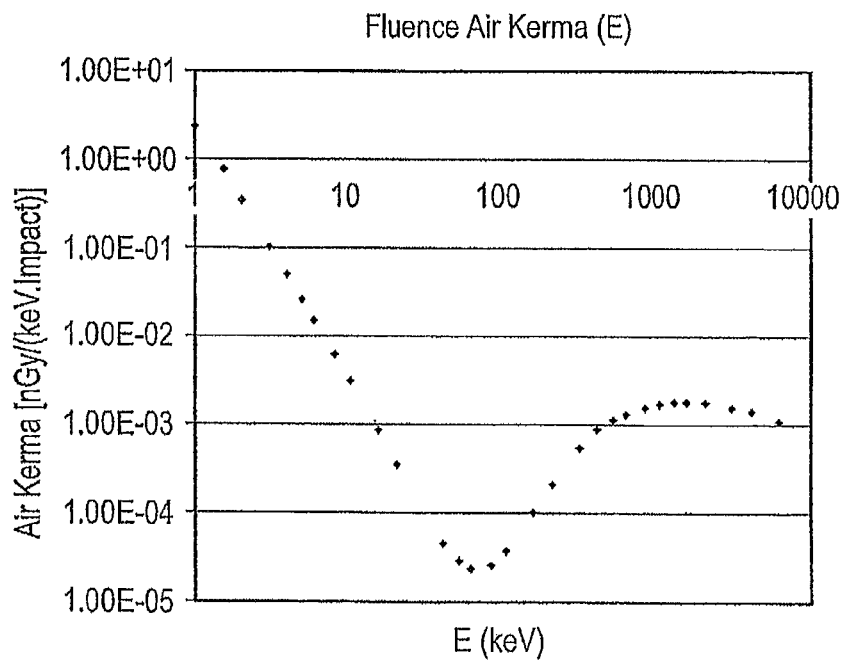

FIG. 4 schematically illustrates a detector system module;

FIG. 5 is a schematic illustration of a system module for a detector device in accordance with an embodiment of the invention;

FIG. 6 is a schematic illustration of an nth and n+1th frame store;

FIG. 7 illustrates a raw data frame and a data frame after fixed pattern noise removal;

FIG. 8 schematically illustrates spatial correction in accordance with an embodiment of the invention;

FIG. 9 illustrates a PID control mechanism operative for an embodiment of the invention;

FIG. 10 graphically illustrates pixel mean values against frame mean values for different exposure times;

FIG. 11 is a graph of air kerma against energy; and

Figure 12:
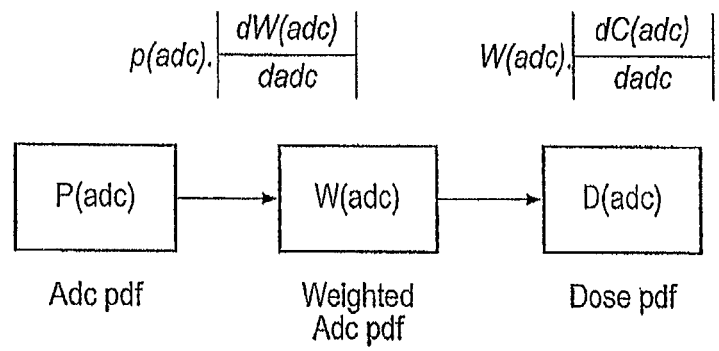

FIG. 12 schematically illustrates stages in an energy compensation calibration process.

DETAILED DESCRIPTION

Detector Substrate

A detector in accordance with an embodiment of the present invention has a semi-conductor crystal 4 clad on one surface thereof with a plurality of conductive contact pads 10 which may act as charge collection electrodes and on an opposing side surface clad with a layer of conductive material 6 for forming a biasing electrode. The array of contact pads forms a pixellated surface 7.

In the illustrated example the semi-conductor crystal 4 is CdTe but other suitable semi-conductor materials may be used, such as CZT, Si, GaAs, CdMgTe or a halide-metal compound with a high atomic number, by way of non-limiting example.

Each conductive pad 10 is electrically isolated from the other contact pads. The array of pads 10 forms an array of ionising radiation sense volumes 12. In the illustrated example an array of 50×50 sense volumes 12 is created from the array of conductive contact pads, each pad having dimensions 100 microns by 100 microns. Typically the contact pads are square, but they could be any other suitable shape such as triangular, hexagonal or other polygonal shape or circular, for example.

The conductive material for the conductive contact pads may be any suitable material for depositing on a semi-conductor, in particular a high Z (atomic number) semi-conductor, and may comprise aluminium (Al), gold (Au), or platinum (Pt) for example.

Detector Structure

Figure 1:
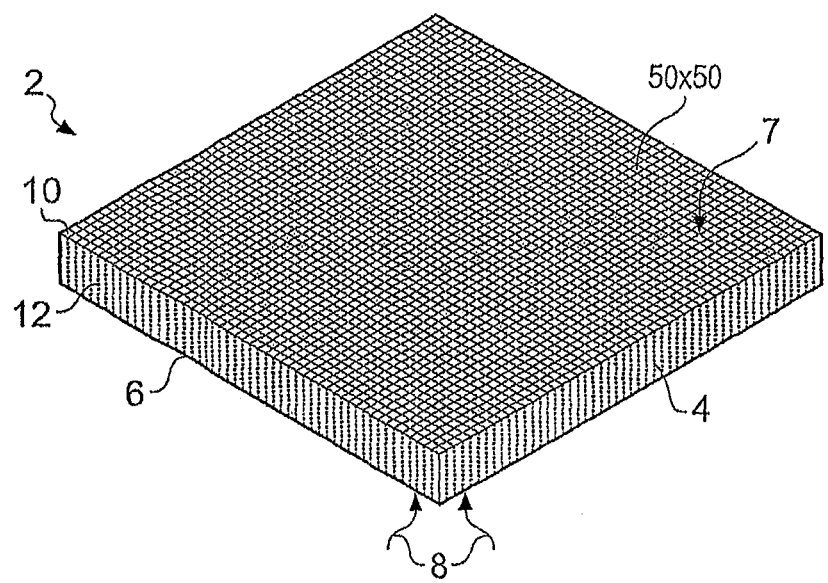
FIG. 1 is a schematic illustration of a detector substrate for a detector device in accordance with an embodiment of the invention.
Figure 2:
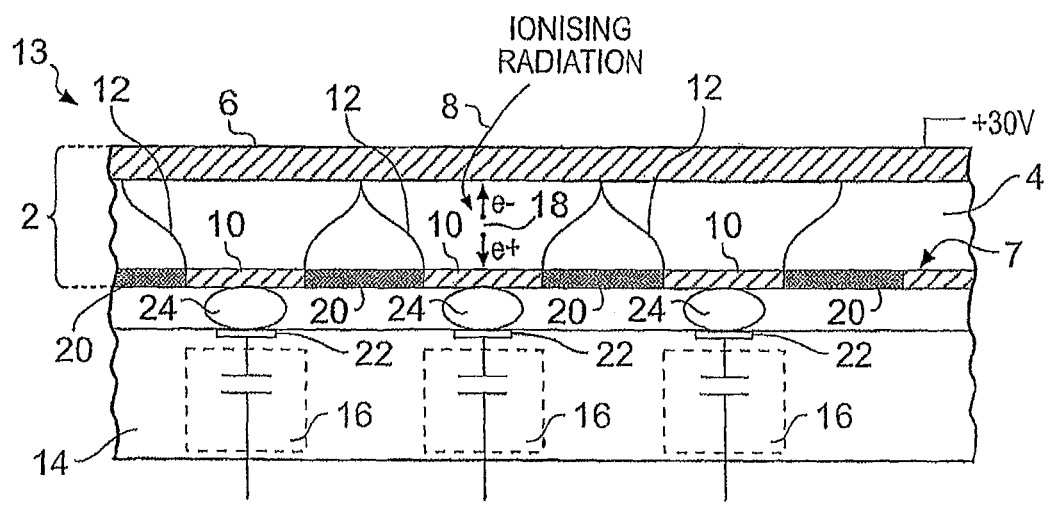
FIG. 2 is a schematic illustration of the cross-section of a detector device in accordance with an embodiment of the invention.

A cross-section of a detector device 13 as illustrated in FIG. 1 comprising a detector substrate 2, as illustrated in FIG. 2, and semi-conductor circuit substrate 14 is illustrated in FIG. 2. In use a bias voltage, for example 300 volts (other bias levels may be used suitable for the detector substrate material in use), is applied between the arrays 7 of conductive pads 10 and the conductive layer 6. For example, circuit substrate 14 and contact pad array 7 may have a reference potential of −150V whilst the conductive layer 6 may have a reference potential of 150V.

The applicant has coined the term "voxor" (volume sensor) to refer to a sense volume comprising the three dimensional energy collection cell within the detector alone or with the circuit substrate collection circuitry and one or other meaning may apply depending on the context in which the term "voxor" is used.

As illustrated in FIG. 2 ionising radiation 8 incident on the detector 13 forms an electron-hole pair 18 in a sense volume 12 (referred to herein as a photon interaction event) and the bias voltage causes the positive and negative charges (holes e+ and electrons e−) to migrate to contact pads 10 in array 7.

In the illustrated embodiment the electrically isolating space between contact pads 10 is filled with a passivation material 20, for example aluminium nitride, to enhance the electrical separation and isolation of the contact pads 10 from each other.

The circuit substrate 14 supports an array of read-out circuits 16, there being a corresponding number of read-out circuits 16 on each circuit substrate to the number of sense volumes 12.

Each read-out circuit 16 includes a circuit contact 22 for electrically coupling the read-out circuitry 16 to the detector substrate 2. A conductive bond 24 couples the detector substrate 2 to circuit substrate 14 to form a hybrid detector 13.

In the illustrated embodiment, bonding of the detector substrate 2 to circuit substrate 14 is by way of bump-bonding. The bump-bonds 24 both mechanically and electrically couple the detector and circuit substrates together. The mechanical coupling of the bump-bonding is often augmented by the practice of "under filling" in such detectors e.g. a low viscosity insulating epoxy resin is introduced into the space between bumps. The bump-bonds 24 are made of a low temperature solder such as a tin-bismuth mixture, which is particularly suitable for use with the CdTe detector material used in the described embodiment, since CdTe (and CdZnTe) is sensitive to heating and can be damaged if subjected to high temperatures, for example over 200° C. The chemicals suitable for growing bumps which fulfil this low temperature criterion are generally available from industrial sources.

The read-out substrate in the described embodiment supports CMOS circuitry and is configured as an ASIC. However, embodiments of the invention need not be limited to CMOS ASICs, but may use other substrate technologies including printing circuit board (PCB) technologies.

An advantage of having an array of relatively small cross-section sense volumes is that "hole trapping" is reduced. "Hole trapping" is the phrase used to describe the phenomenon of holes becoming locked in deep levels within the semi-conductor forbidden band. It is a common problem observed with semiconductors. The resultant partial charge collection results in low resolution of the high-energy, e.g. gamma energy, radiation. According to the small pixel theory (see papers by Barrett et al. [1] and Eskin et al. [2]) the signal contribution related to electrons dominates over the contribution from the holes in detectors having small detector volume cross-section such as pixellated detectors. This leads to an improvement in energy resolution with reduction of the aspect ratio of the sensing volume side to its thickness. The rationale is as follows. Due to hole trapping and field effects the induced charge relates to the electron flow from interactions relatively close to the read-out circuit input (e.g. conductive pad of the detector substrate). However, the holes flow towards the common negative contact. Consequently, their cumulative contribution is distributed over a number of sense volumes, thereby effectively excluding the hole contribution from a single sense volume signal.

The net effect is that detectors formed of an array of sense volumes ("pixellated") will generally provide better energy resolution than slab based approaches.

Charge Collection Circuitry

Figure 3:
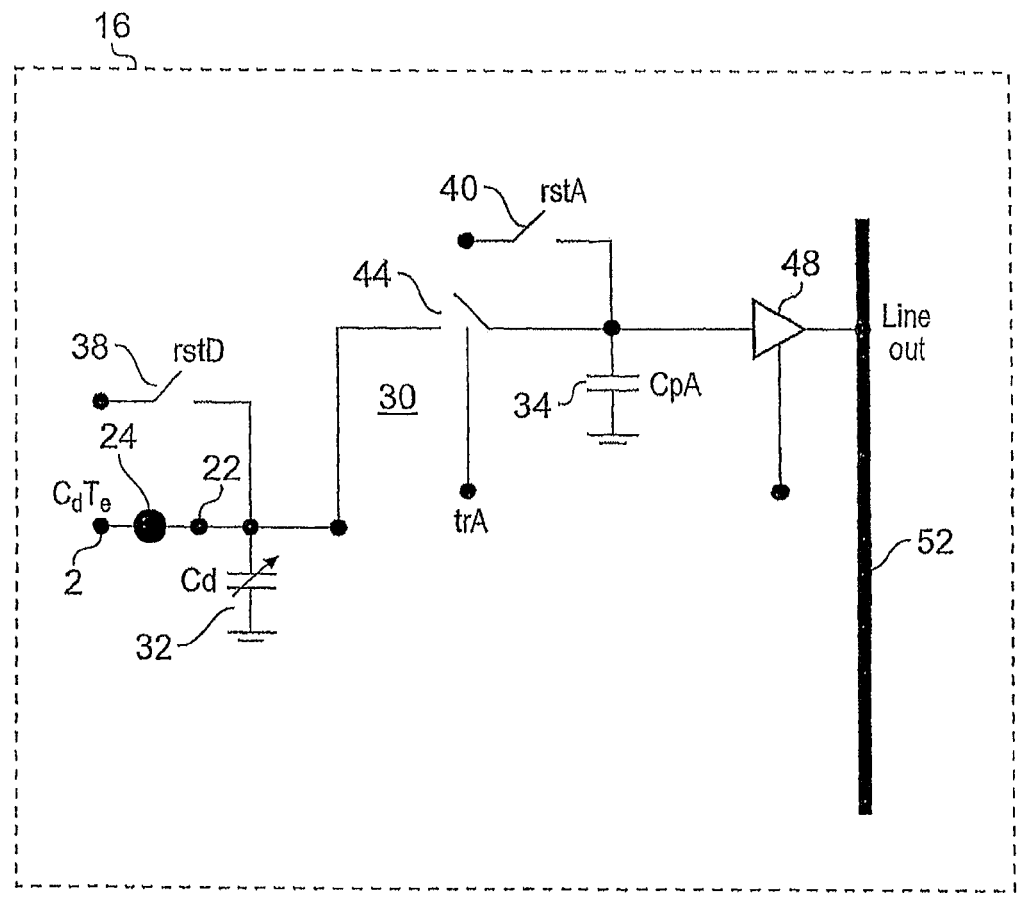
FIG. 3 is a schematic illustration of charge collection circuitry of a detector device in accordance with an embodiment of the invention.

Turning now to FIG. 3, there is illustrated a schematic circuit diagram for a read-out circuit 16 in accordance with an embodiment of the invention. In the described embodiment the read-out circuit 16 is a CMOS integrated circuit including capacitance circuitry for integrating charge pulses received from the direct dose detection radiation detector substrate 2.

Charge collection is carried out by charge integration circuitry 30 which includes two capacitances, variable capacitance Cd 32 and capacitances CpA 34. Also included in the charge integration circuitry are reset switches 38 and 40 for respectively discharging capacitances Cd and CpA. Switch 44 may be operated to couple capacitance CpA to capacitance Cd. Each capacitance includes a capacitative circuit element which may be a discrete capacitor component or comprise parasite capacitances of other circuit elements, or a combination of both discrete and parasitic capacitances, for example. The capacitances also include resistive circuit elements which may again be discrete components, parasitics or a combination of both types of resistance.

Capacitance Cd is coupled between the circuit contact 22, which is coupled to the CdTe detector substrate 2 by a bump-bond 24, and the reference potential for the circuit substrate, 14. It will be evident to the person of ordinary skill that reference potentials other than those referred to herein may be used depending upon circuit implementation.

The charge integration circuitry 30 may be operated by closing switch 44 to couple Cd and CpA together to form a capacitance suitable for capturing charge relating to a single detection event. In the described embodiment the total capacitance for a combination of Cd and CpA is 150 fF.

Variable capacitor Cd 32 may be varied to take account of charge generation of different detector substrates 2 so that a single circuit substrate 14, may be used for different detector substrates 2.

Charge Read-Out

For the purposes of providing an illustrative example only, the operation of read-out circuitry 16 will now be described for a clock rate of 1 MHz and a 50×50 (2500) array of read-out circuits 16. Such operational parameters provide a theoretical maximum total charge integration time of 2.5 milliseconds per read-out circuit, although in practice some of this time will be used in circuit "housekeeping" such as resetting various capacitances. The operation of read-out circuitry 16 will also be described for ionising radiation flux densities exposure rates up to 4 Gy/hr. For the illustrative flux density range, the variable capacitance Cd is tuneable from 50 fF to 200 fF. Evidently, for other flux ranges the range of capacitance over which Cd may be varied will be correspondingly modified. The capacitance needs to be sufficient to allow for the collection of charge resulting from the photo-electric interaction of a photon interaction event. This is dependent on the energy of the incident photons, the mass transfer coefficient for the detector material at this given energy and the energy required to generate an electron hole pair for the material.

The 50 to 200 fF range for capacitance Cd includes detector substrate parasitic capacitances which for the CdTe based detector substrate 2 are about 30 to 5 OfF. Switches trA, rstA and rstD are MOSFET transistor switches, but other switch means may be used, for example other forms of transistor switch. As illustrated, switches trA switches capacitance CpA into Cd, whilst rstA switches capacitance CpA to the reference potential for discharging the capacitances.

Output buffer 48 is coupled to the output of the charge integration circuitry 30. Buffer 48 is controllable to output a signal derived from the capacitance CpA and CpD to an output bus "line-out" 52.

The output buffer 48 may comprise simple tri-state buffer circuitry, although optionally the buffer may also comprise additional pre-amplification circuitry.

In one embodiment the output buffer 48 is configured as a two stage amplifier consisting of a first stage charge amplifier and a second stage differential amplifier attached to line-out 52, where the reference for such amplifiers are taken from a reference dummy read-out circuit, i.e. e. an unconnected read-out circuit. This allows the amplification to be made relative to ASIC related offset conditions e. g. temperature change.

The output from capacitance CpA is fed to respective charge amplifiers of two stage amplifiers 48 to produce a pulse suitable for input on to bus 52. This output then forms the input to the line based differential operation amplifier of the two stage amplifier 48, together with a reference input from the read-out circuit structure unconnected to the detector substrate. The output from these line amplifiers is then received by analogue to digital conversion interface circuitry.

The amplifier 48 is configured to produce pulses having magnitude or height proportional to the amount of charge collected in capacitance CpA. The amplifiers have good high frequency response in order to be able to handle the sharply-peaked pulses from the capacitances, as well as a high input impedance and linear response to the pulses.

The read-out circuitry 16 is operated to provide a charge capture window for capacitance CpA in which to capture charge generated by a single detection event in the corresponding sense volume 12. In the described embodiment the array of charge circuitry 30 of circuit substrate 14 corresponding to respective arrays of contact pads 7 is driven to read-out charge in a raster scan pattern.

System Module

The system modules for an example of ionising radiation detection device 100 incorporating a detector device 13 are illustrated in FIG. 4. The system module responsible for converting the incoming radiation into digital signals is shown as "sensor module" 101. The sensor-module contains the radiation detector 13 (ASIC circuit substrates 14 bonded to the detector substrate 2) and a Field Programmable Gate Array (FPGA) 104 having the logic required to provide a control interface for the ASIC. The FPGA also controls the exposure window for the detector. Charge is collected on a frame by frame basis from the detector, and the period for which charge is collected is known as the exposure window. The FPGA 104 sends control signals to the ASIC for controlling the sample and hold circuitry in the read-out circuitry 16 in accordance with an exposure window.

The analogue data received from the ASIC circuit 14 is converted to digital form via the A/D converter 109 which in the illustrated embodiment are part of the FPGA 104. Typically, FGPA 104 in addition to containing the interface logic to control the ASIC, would normally also contain an implementation of a device calibration algorithm which ensures that the charge values are directly related to incident photon energy and cumulative exposed dose respectively. In general terms, the FPGA 104 produces a digital data output corresponding to "normalised" charge values detected at the pixel contact pad electrodes 10.

FPGA 104 also includes a temperature sensor 105, which provides temperature data corresponding to the temperature of the detector substrate. Based on the data from the temperature sensor the FPGA applies different pixel sensitivity correction values. The FPGA also monitors the dark leakage current (leakage current when no radiation incident on the detector substrate) and bright leakage current (leakage current when radiation is incident on the detector substrate). Based on the values of dark and bright current the system corrects the final frame dose estimate. This is to correct for global changes charge collection efficiency which are related to total current.

The conversion results are transferred over serial data bus 106 to Memory Access Control (MAC) unit logic 108 on interface module 107. The MAC logic 108 stores the radiation data in memory 112 and interfaces with the micro-controller 110.

Micro-controller 110 controls all the elements of the ionising radiation detection device 100, for example memory management (102), display (116), communications (118) and user interface (120). Additionally, microcontroller 110 is configured by programs stored in EEPROM 114.

Under control of microcontroller 110 charge values received into memory 112 are used to form a cumulative normalised spectrum, incorporating information from the recent past. The spectroscopic information is used as the basis for isotopic identification. In the described embodiment two dose calculation modes are used. In mode 1, the number of photon "hits" may be recorded on frame by frame basis. The number of hits per frame may be used to indicate the radiation flux whilst the hits over a number of frames may be used to calculate an overall radiation dose. This can be either carried out by the controlling microcontroller or performed off the device using external processing power. In mode 2 the corrected hit data (the data corresponding to a calibrated charge) is collected on a frame by frame basis. This data is then converted via a non-linear (adc to dose) calibration curve to provide a per frame dose. Given the frame exposure time this per frame dose can then be converted to a cumulative dose or dose rate.

The data from microcontroller 110 may be transmitted to a remote location using the communications module 118. The communications module 118 may be a wire-based communications module, or a wireless-based communications module, typically for a local area network where low power radio communication is suitable, such as Bluetooth. Optionally, wire-based communication may be over much greater area, and the communications module 118 configured to comprise a higher power radio unit such as a cellular telephone transceiver or alternatively be linked to such a device via the local short distance wireless link.

The ionising radiation detection device 100 also includes a user interface 120, for providing user input controls to the device such as on/off functionality, and options for displaying various types of information.

Typically the components on the sensor-module are low power, which is particularly important for a portable detector, and it is particularly advantageous if powers saving techniques are implemented in order to minimise power consumption when no radiation is present.

Noise and Error Correction Chain

In an embodiment of the present invention, the acquisition of raw data in the form of charge from the detector ASIC 14 and the correction of noise and errors in the raw data is carried out in the FPGA 104. The acquisition of the charge and correction of noise and errors is carried out in real-time within an exposure window period, such that the corrected data may be output to the memory access control 108 before the next frame of charge is acquired by the FPGA 104.

The architecture of the noise and error correction in an embodiment of the present invention is illustrated in FIG. 5. In general terms, raw charge is acquired from ASIC 14 on a frame by frame basis in accordance with an exposure window time period, 150. The raw charge is converted to a raw digital charge value by ADC 109. Fixed pattern noise, including offset errors, is then removed from the raw charge data, 152, and the charges corrected on a pixel by pixel basis 154 in accordance with gain calibration data to compensate for individual pixel variations such as sensitivity.

The charge data is then threshold filtered 156 to remove "noise" signals caused by low energy reflected radiation or other sources of radiation "noise". The charge data is then spatially corrected, 158, he take into account photon interaction events in which charge is collected at adjacent pixel electrodes. The number of pixels for which a non-zero output value was recorded, following the noise and error reduction chain processing, are then summed, 160 to give a total "hit per frame" count for that particular exposure window. Finally, the charge values are converted to energy values, 162. The energy values are then forwarded over serial bus. 106 to memory access control 108 for storing in memory 112.

Fixed Noise Pattern Removal

Each pixel typically has a gain and offset characteristic different to other pixels. In order to obtain a uniform response across the pixel array, calibration and correction for the different gain and offset characteristics for each pixel is performed. Fixed noise pattern removal compensates for pixel to pixel variations in pixel offset behaviour.

In the described embodiment, compensation for pixel offset behaviour is by way of "frame differencing". As schematically illustrated in FIG. 6, in the present embodiment the FPGA 104 comprises at least two frame stores 172 and 174 in which the nth and n−1th frames of ADC count values may be stored. In principle, the analogue to digital count value (ADC count value) for a pixel in the nth frame has subtracted from it the ADC count value for the same pixel in the n−1th frame, that is to say $ADC_{x, y, n} - ADC_{x, y, n-1}$. This subtraction results in the offset of the pixel being eliminated from any subsequent calculation. This subtraction takes place for all pixels in a frame, and for the 50×50 pixel array of the described embodiment a set of 2500 different values is generated which is termed a difference frame. The values of the n−1th frame are subtracted from the values in the nth frame such that the nth frame becomes the difference frame. In such an embodiment a third intermediate or result difference frame is unnecessary. It is the difference frame upon which subsequent processing takes place. Optionally, the FPGA 104 comprises a further 50×50 frame store for storing the difference frame.

A graphical illustration of a frame of raw digital data and a difference frame where the offset has been removed is illustrated in FIG. 7.

Other techniques for fixed pattern noise removal as may be known to ordinarily skilled person also be used.

Gain Compensation

Gain compensation uses calibration data previously obtained for the detector 13, for example during manufacture, and stored in FPGA 104. In general terms, the calibration process has measured the gain of each pixel against known radiation sources at different temperatures for example at 10° C. intervals, and calculated a correction factor. For an operating temperature range of 70° C. eight sets of 2500 correction factors are generated, and stored in the FPGA 104. Typically, the set of correction factors are unique to a specific detector and ASIC combination.

Additionally, during the calibration process pixels at the outer edge of the detector substrate have their gain correction factor set to Zero. This is because a pixel at the outer edge of the detector substrates experiences a different environment to other pixels in that they only have three or five neighbouring pixels, rather than the eight pixels which surround any interior pixel. Furthermore, the "dicing" process for cutting pixel detector substrates may adversely affect the detector behaviour such that it is difficult to compensate for charge values generated in the outer pixels. By setting the gain of these pixels to zero they are in practice ignored.

The gain correction factors stored in the FPGA 104 and corresponding to the ambient temperature are applied to each pixel ADC count value ($ADC_{x, y, diff}$) in the difference frame in order to get a gain corrected difference frame.

Threshold Filtering

A numeric threshold is applied to each pixel ADC count value ($ADC_{x, y, diff}$) in the difference frame. Any count value not exceeding the threshold is set to zero. In this way, count values representing noise rather than real event created measurement data may be eliminated. This results in a threshold filtered gain compensated difference frame.

Spatial Correcting

An example of an embodiment of the invention utilising spatial correcting to compensate for charge being generated on more than one pixel contact pad electrode for a given photon interaction, for example where there is oblique incident radiation, will now be described with reference to FIG. 8 of the drawings. In the present example the spatial correcting is conducted on the gain corrected difference frame referred to above. Each ADC count value in the difference frame corresponds to charge collected on a corresponding pixel contact pad electrode during a frame exposure.

FIG. 8 (*a*) shows a rectangular array 180 of ADC count values each corresponding to a "pixel" of the detector 13, which may be stored in a frame store in FPGA 104 for example. A 2×2 correction window 182 starts at one corner of the array, FIG. 8 (*a*) (i) and is moved to across the array in a raster scan of one pixel steps to each correction position as shown in FIGS. 8 (*a*) (ii) to 8 (*a*) (iii). When one horizontal scan is completed, the correction window starts at the beginning of the next row. The scan and spatial correction are mutually arranged so that the ADC count value estimated by the correction at a given correction position is not later used again for estimating other ADC count values during the scanning and correcting the rest of the frame. The spatial correction is based on a logical condition for the pixels in the correction window being satisfied. For ease of description respective pixels in the correction window 182 are labelled a, b, c and d as shown in FIG. 8 (*b*). In the described embodiment, the estimate of ADC count value at each correction position is carried out for pixel a (ADCa) only.

In one example, the spatial correction tests for the following logical condition for the ADC count values ADCa, ADCb, ADCc and ADCd within the correction window 182:

$$(ADCa <> 0) \text{ OR } (ADCb <> 0 \text{ AND } ADCc <> 0) \quad (1)$$

where the expression "<>" indicates a value not equal to zero.

If condition (1) is satisfied then ADCa is set equal to the sum of the count values in all the pixels, i.e.:

$$ADCa = ADCa + ADCb + ADCc + ADCd \quad (2)$$

and the other ADC count values are set to zero, i.e.:

$$ADCb=ADCc=ADCd=0 \quad (3)$$

The original value for ADCa is overwritten within the difference frame undergoing spatial correcting.

Examples of cases where a single ADC count value within the correction window is greater than zero are illustrated in FIG. 8 (c). Only the case illustrated in FIG. 8(c) (i) satisfies logical condition (1) and so ADC count value is assigned a value corresponding to the sum of the ADC count values in all the pixels which gives a value ADCa, i.e. the original value for pixel a, as illustrated in FIG. 8 (c) (v).

The cases for two pixels having non-zero ADC count values are illustrated in FIG. 8 (d). Only the cases in FIGS. 8 (d) (i) and (ii) satisfy condition (1) and result in ADCa count value being assigned the value ADCa+ADCb or ADCa+ADCc according to the cases shown in FIG. 8 (d) (i) or 8(d) (ii) respectively. Cases shown in FIGS. 8 (d) (iii) and 8 (d) (iv) result in ADCa remaining zero.

Cases where three pixels have non-zero ADC count values are illustrated in FIG. 8 (e). The illustrated table shows which part of condition (1) are satisfied for which cases. As condition (1) is satisfied for all cases ADC count value ADCa is equal to:

ADCb+ADCc+ADCd for case 8(e)(i);

ADCa+ADCc+ADCd for case 8(e)(ii);

ADCa+ADCb+ADCd for case 8(e)(iii); and

ADCa+ADCb+ADCc for case 8(e)(iv).

For four pixels non-zero as illustrated in FIG. 8(f) (i) condition (1) is satisfied and count value ADCa is equal to ADCa+ADCb+ADCc+ADCd.

The spatial correction process results in a difference frame having spatially corrected ADC count values.

The logical condition may be varied to suit different spatial correcting requirements, as may the pixel combinations dependent on the condition being satisfied. Additionally, the correction window need not be limited to a 2×2 window, but may be of any size suitable for a desired form of spatial correcting. Furthermore, the array of pixels (e.g. ADC count values) may be configured in other than a rectangular array and the correction window may be configured other than as a rectangular or square window. A raster scan need not be utilised, but merely a scan suitable for obtaining a desired spatial correction wherein an estimated pixel value (e.g. ADC count value) is not used in later correction operations in the frame.

As disclosed above, there are certain incident radiation scenarios which may result in charge being collected at more than one adjacent pixel contact pad electrode 10 that are not due to oblique incidence of the radiation. These scenarios give rise to errors in the spatial correction for oblique incidence. Briefly these are: where two hits in the same pixel in a single frame are recorded; two hits in adjacent pixels in the same frame are recorded; and two hits in the same pixel in successive frames are recorded.

The occurrence of these causes of error are probabilistic in that they will occur and cause errors in measurements based on the likelihood of radiation being incident in accordance with one or other scenarios outlined above. Their likely occurrence is dependent on the duration during which a measurement is taken, e.g. a frame exposure, and the applicant has recognised that appropriate control of the frame exposure window may reduce the likelihood of one or more of the scenarios occurring.

Exposure Window Control

In order to limit the occurrence of incident radiation detection scenarios which may give rise to measurement errors an embodiment of the invention controls the duration of the exposure window.

The duration of the exposure window is controlled by controlling the time for which the sample and hold circuitry of charge integration circuitry accumulates charge, for example by controlling the gate signal of transistor 40. Control of the gate signal is by way of a closed loop process which hunts for a desired number of hits per frame. If the number of hits is too high the exposure window duration is reduced, and likewise if it is too low the exposure window duration is increased.

There is a trade-off between having sufficient levels of energy in each frame for the measurements to be meaningful and restricting the likely number of hits to a level for which the number of error inducing scenarios is acceptable and corrections and calculations remain valid. The number of hits for each frame is dependent on design constraints and may be selected according to the three error criteria a, b, c outlined previously i.e. the possibility of double hits in a single pixel, genuine hits in adjacent pixels and hits in the same pixel in subsequent frames.

In the described embodiment, a level of 50 hits per frame has been selected.

This gives an average of 1 in 50 (50/2500) pixels recording a hit per frame.

Two Hits in the Same Pixel in a Single Frame

Embodiments of the present invention may be directed to detecting high-energy radiation which is a result of radioactive decay. Radioactive decay may be considered a Poisson process [3] and thus the probability of k hits in the same pixel is given by $$p(k) = \frac{e^{-\lambda}\lambda^k}{k!} \quad (4)$$

Where $\lambda$ is the expected value for events per frame. For a selected hits per frame count of 50 the expected value is 1/50 and for k=2 (two hits per pixel), the probability of two hits in the same pixel is given by:

$$p(2) = \frac{e^{-\lambda}\lambda^k}{k!} = \frac{e^{-1/50} \cdot (1/50)^2}{2!} = 1.9604e-4 \quad (5)$$

Two Hits in Adjacent Pixels in the Same Frame

The Poisson Forest equation gives the probability of randomly getting k hits within a distance r as [4]

$$p_r(r) = \frac{2\pi\lambda r(\lambda\pi r^2)^{k-1}e^{-\lambda\pi r^2}}{(k-1)!}$$

For k=2, $\lambda$=50/2500 and r=1 the probability of k hits within one pixel is:

$$p_r(1) = \frac{2\pi\lambda(\lambda\pi)^1 e^{-\lambda\pi}}{1} \quad (6)$$

$$p_r(1) = 2(\lambda\pi)^2 e^{-\lambda\pi} = 0.007420 = 7.42e-3 \quad (7)$$

Two hits within adjacent pixels includes two hits on the same pixel and so the result (7) is multiplied by the probability for one hit on a same pixel, i.e. Probability of a single pixel being hit $$= p(1) = \frac{e^{-\lambda}\lambda^k}{k!} = \frac{e^{-1/50} \cdot (1/50)^1}{1!} = 1.96e-2 \quad (8)$$

So the probability for this case is $0.0196 \times 0.007420 = 0.000145 = 1.45e-4$ Two Hits in the Same Pixel in Successive Frames This is just the probability of one hit per pixel squared which is:

$$p(1) \cdot p(1) = \quad (9)$$

$$\left(\frac{e^{-\lambda}\lambda^k}{k!}\right)^2 = \left(\frac{e^{-1/50} \cdot (1/50)^1}{1!}\right)^2 = (1.96e-2)^2 = 3.841e-4$$

In the described embodiment the worst case scenario is a probability of around 7 thousandths which is of the order of the error due to electronic RMS noise.

In the present embodiment a closed feedback loop such as a proportional, integral, derivative (PID) controller is implemented in the microcontroller 110 in order to control the exposure window to maintain a pre-set number of hits per frame. The microcontroller 110 receives a signal representing the number of hits per frame from the FPGA 104 and is configured to compare that number (plant feedback signal in PID terminology) against a pre-set number of desired hits per frame (command signal in PID terminology). The difference, or "error", signal between the command and feedback signals is utilised to change the timing of the gate signal on transistor 44 of the read-out circuits 16 in a direction to generate the desired number of hits per frame.

A variable gain is included in the feedback, dependent upon which decade the exposure control is in e.g. a different feedback gain is used to control 1 ms to 10 ms exposure window duration compared to a 0.1 ms to 1 ms exposure window duration. Additionally, the proportion of gain applied includes a "guard" gain in order to provide an element of over correction so that the exposure window duration is not changed too often.

FIG. 9 shows an example embodiment of a PID (proportional integral derivative) control mechanism 200 applied to the problem of hit rate control. Such feedback based control mechanisms use the error rate 206 in the control parameter, in this case the observed hit rate 202 minus the required hit rate 204 is used as the "plant" conditions, in this case the exposure rate. Such algorithms balance, smooth and provide an immediacy of response. The proportional functions 208 and 210, integral 212 and derivative 214 functions are a matter of design choice for the ordinarily skilled person.

The temperature of the detector substrate 4 is also used to control the exposure window. During calibration the dark leakage currents are measured for a series of temperatures e.g. −20 to +50 C in 10 degree steps. These leakage values provide the basis for the maximum exposure times permitted for a particular temperature. The exposure times are chosen such that the dark leakage charge fills a maximum of 75% of the ADC range.

The exposure time is reduced for increases in temperature in order to provide sufficient dynamic range in the ADC 109 for converting collected charge into digital values. This is advantageous since the amount of charge generated and collected by a pixel contact pad electrode for a photon interaction event of a given energy is dependent on the temperature of the detector substrate. Conversely, the exposure time may be increased for decreases in temperature.

Frame Summation

FPGA 104 is configured to count the number of non-zero ADC count values for each pixel of the difference frame following the spatial correction process. This difference frame has also previously undergone fixed pattern noise removal, pixel sensitivity correction and threshold filtering.

The number of hits counted for each frame is forwarded from the FPGA 104 to the microcontroller 110 where it may be used to determine the radiation flux incident on the detector and establish the exposure window duration. Additionally, a linear sum of the ADC count values in the difference frame provides a single value which represents the total energy received during a frame exposure.

Energy Conversion

The (difference) frame values $ADC_n$, represent the energy measured for each frame at each exposure.

The microcontroller, 110 is configured to take the ADC count values and convert them to energy values and then convert the energy values to dose values by way of a look up to energy conversion calibration data stored in memory 112.

This conversion is performed by the use of calibration values which are stored in the unit. The calibration values are specific to each unit and have values for eight temperatures within the specified temperature range. The current temperature is read from the electronic thermometer on the sensor sub-module and is used to derive an interpolated calibration curve. This curve is then applied to the frame values to generate the dose readings.

The calibration values are derived by testing each device in known fields at known temperatures. Device output data is logged, and then externally processed to generate the calibration curves.

Calibration

During manufacture of the detector 13 calibration is carried out in order to compensate for differences between the detector substrate material forming sense volumes for respective pixel contact pad electrodes 10, and any differences in respective charge collection and read-out circuitry. The calibration is conducted on a pixel by pixel basis in order that variations between pixels may be compensated for on an individual pixel basis, and that charge values from each pixel may be treated in exactly the same way. This allows the pixel ADC values to form the basis of dose calculations. These ADC values are converted to a per photon dose estimate via a non-linear ADC to dose calibration curve (energy compensation). The pixel dose estimates are summed for a particular frame, and knowing the frame exposure time allows these values to be converted to dose rate and cumulative dose values.

Calibration is carried out in a calibration configuration in which a detector 13 undergoing calibration is coupled via communications interface 118 to external data processing apparatus such as a personal computer. ADC values representative of charge values collected from the detector substrate to forwarded from FPGA 104 to a personal computer. The personal computer is configured to analyse the ADC values in accordance with the calibration processes described below to derive sets of calibration data. The calibration data is then stored in the FPGA 104 for use to operation of the detector.

There are three aspects to the detector calibration: bad pixel calculation; gain correction which compensates for different detector sensitivity and energy compensation.

A two phase approach is taken to calibrating for gain and offset, and energy compensation. For gain compensation:

A set of gains is calculated which normalises the response of each pixel.

Equalising the pixel response allows subsequent pixel processing to treat the pixel data as being equivalent e.g. the spatial filtering in the read chain described above may add pixel values together linearly.

In practice, if a pixel differenced approach is utilised only the gain portion of the calibration calculation is required as the offsets are compensated for in the pixel differencing of the read chain process described above.

For the second phase, energy compensation, the nonlinear response between induced pixel charge and external dose in compensated for.

Bad Pixel Calculation

Dark Frame Bad Pixel Process

A dark current leakage frame is obtained with the bias voltage for the detector substrate 2 turned on, but without exposing the detector undergoing calibration to incident radiation. Charge values are collected by the read out circuitry 16 and converted into ADC count values in FPGA 104 and forwarded to the personal computer for inclusion in the calibration analysis Any hit that is observed due to background radiation is excluded e.g. hits can still be detected by frame differencing.

The process collects dark leakage current over a series of frames at a short exposure of 0.5 ms, and over a series of frames at a long exposure of 10.0 ms. Typically, several hundred frames of dark leakage current are obtained, the exact number being a matter of choice for the operator of the calibration process.

For each pixel a leakage current gradient is calculated. A leakage current gradient is defined by:

$$g_{x,y} = \frac{p_l(x, y) - p_s(x, y)}{l - s} \quad (10)$$

Where $g_{x,y}$ is the leakage current gradient for the x,yth pixel,
$p_l^{(x,y)}$ is the mean leakage for the x,yth pixel for the long exposure,
$p_s^{(x,y)}$ is the mean leakage for the x,yth pixel for the short exposure, and
l,s are the long and short exposure times respectively.

The mean leakage current is the mean for each pixel over the series of dark frames.

The mean and standard deviation of the 2500 gradients (50×50 pixel detector) is then calculated and all the pixels with gradients which are outside n standard deviations from the mean (for example in one embodiment n is 4) are designated bad pixels.

The personal computer creates a bad pixel mask in which a "1" indicates that the pixel data should be retained and a "0" indicates the pixel is bad and the values should be rejected. This mask is used in further calibration processes to avoid calibrating using a bad pixel.

Bright Frame Pixel Values

Bright frames are obtained by operating the detector under radiation sources representative of the type of radiation that the detector will be used to detect. In one example the bright pixel values are obtained using $^{241}$Am (Americum) and $^{137}$Cs (Caesium). The activities are not particularly important.

In one example the sources output the following radiation levels:

The Am source outputs 1.67 GBq=18.3 µSv/hr=120 cps/µSv/hr=2000 cps approximately; and The Co source outputs 64 MBq 77.5 µSv/h=1.1 cps/µSv/h=85 cps approximately, where cps denotes counts per second and µSv/h micro Sieverts per hour.

For each of the Am and Cs sources 200,000 frames of data are obtained. For each pixel the mean, standard deviations, skew, kurtosis, max, min, median and number of hits is calculated for the frames corresponding to a particular isotope.

For each set of frames two sets of bad pixel masks are generated.

Hit Based Mask

The number of hits are distributed as a Poisson process as defined by equation (4) above, and repeated here for clarity:

$$p(k) = \frac{e^{-\lambda}\lambda^k}{k!} \quad (4)$$

Where k is the number of hits and lambda indicates the mean hit value.

Taking mean hit values the probability associated with particular hit values is calculated.

Using this relationship hit count thresholds associated with a particular probability may be calculated, i.e. pixels may be excluded which have a number of hit associated with small probabilities i.e. they represent outlier in terms of too many of too few hits. In the described embodiment, the probability threshold is set at 1 in 1,000,000. Masks $msk_{pois,\ am}$ and $msk_{pois,\ cs}$ are created in which excluded pixels are given a "0" value and the rest a "1" value.

Hotellings $t^2$ Mask

The remaining statistics mean, standard deviations, skew, kurtosis, max, min and median are used as the basis of a multivariate outlier test. For each pixel a hotelling's $t^2$ value is calculated. Calculation of hotelling $t^2$ values is known and is described in a text book "Johnson, R. A. and Wichern, D. W. (1992), Applied Multivariate Statistical Analysis. 3rd. ed. New-Jersey: Prentice Hall. pp. 180-181, 199-200". The probability associated with each hotellings values is calculated, and any pixels which represent outliers i.e. which look less like the bulk of the pixels, are excluded. Again, this embodiment uses a probability threshold of 1 in 1 million. Masks $msk_{hot\ am}$ and $msk_{hot\ cs}$ are created in which excluded pixels are set value "0" and the rest value 1".

A final mask is formed on the basis of:—

$Msk=msk_1|(msk_{pois,am}|msk_{hot,am})\&(msk_{pois,cs}|msk_{hot,cs})$

Where "|" denotes "or" and "&" denotes "and".

The final mask is used further in the calibration process to avoid calibrating using bad pixels. For example, it may be loaded into every pixel gain mask prior to further processing of the frame. The pixel values are multiplied by the gain mask for each frame. Consequently, excluding the bad pixels whose mask value is "0".

Additionally, the bad pixel mask is combined with a pixel gain mask, described later in the calibration process, and stored in the detector 12 memory 112 and accessed by the FPGA 104 to compensate charge values collected in a frame.

Thus, the combined bad pixel and gain mask only has gain values not equal to zero for "good" pixels, the bad pixels having a gain of zero by virtue of being combined with the bad pixel value "0".

Gain Calibration

A problem with calibrating gain values and in order to normalise the gains in a meaningful way energy compensation should be applied. However, the applicant has recognised that there are two ways to calculate calibration gain values not dependent on energy compensation:

Leakage current based gain calculation; and
Hit count based gain calculation.

An advantage of a leakage current based calculation is that the apparatus characteristics do not differ between signal and leakage current operation. Normalisation of leakage is a good thing in that it partially ameliorates the "in exposure" decay problem described below.

The "in exposure" decay problem results from the fact that a signal from each pixel is the result of a number of interacting processes. There is for example:

Induced charge from incident radiation;
Charge stored as a result of bulk substrate leakage current; and
Charge leaked as a result of ASIC leakage current.

For long exposure periods the ASIC leakage component can become a significant factor.

When no incident radiation charge is present the signal from the pixel is the result of the equilibrium between the incoming bulk leakage and the out going ASIC leakage. Using the frame difference approach as described above this is what is subtracted from a pixel containing an incident radiation charge. However, a problem may arise when the ASIC leakage is significant during the frame exposure time when compared to the induced photon charge, and if this occurs the charge value should be compensated.

Knowing what the expected ASIC leakage was would allow for the adjustment of the resultant signals accordingly.

Estimating the rate at which current leaked away may be achieved by ASIC simulation but is as only reliable as the simulation model. An experimental approach would be more reliable.

The second approach is based on the number of hits. This is based on the following hypothesis:

All pixels "see" the same flux (photons per unit area per unit time N. B. fluence is merely the integral of flux); and
Consequently over a "long" period of time exposed to same overall fluence each pixel should measure the same number of hits.

However, such an approach may encounter problems due to:

The distribution affect; the bulk of the probability distribution is towards the low energy photons (because of Compton scattering etc). This means that gain variations are primarily influenced by this part of the spectra i.e. increase probability means more hits.
Threshold affect; the hits are defined by the energy values falling above the threshold value. In practice, this can only work by moving hits below the threshold to above the threshold. Therefore the only photon values which will be taken into consideration by the hit count based gains are those immediately below the threshold. Consequently, hit count based gains are a function of the threshold value used.
Shot noise due to the photons being quantised. Hence, there exists natural uncertainty which implies large sample size in order to reduce However, the applicant has appreciated that the gains should be adjusted to make the spectral response of each pixel as similar as possible. Using this insight, an embodiment of the invention uses the threshold affect to advantage i.e. the threshold is varied and the gains adjusted for each threshold value. This produces a set of gains for each different bit of the energy spectrum. The mean gain for each pixel is calculated, which provides a maximum likelihood estimate of the gain values which maximise the similarity of the individual pixel spectra.

In the described embodiment the two methods discussed above may be used for calculating pixel gain corrections.

In a first method gain correction calculation is based on dark current leakage. The graph in FIG. 10 shows leakage based gain calculation results as a calibration graph for an individual pixel. The average pixel gain (pixel mean gain) over a series of frames is plotted against the average frame gain (frame mean gain) for different exposure times. A graph of the type illustrated in FIG. 10 is generated for different temperatures as the detector substrate behaves differently at different temperatures.

For example, the ADC values for 1000 dark field frames at a particular exposure time are obtained. The 1000 ADC values per pixel are averaged to find the pixel mean gain. The term pixel mean refers to the mean of these 1000 values. The frame mean is the mean of the pixel means.

The gain graph defines an input output relationship for an individual pixel, and data is collected to produce a gain graph for each pixel. The gradient of the graph defines the pixel gain deviation from a normalised gain defined by the frame mean. In effect, the graph maps for each pixel how the individual pixel leakage varies in comparison to the average pixel leakage defined by the frame mean. Effectively the average leakage represents the standard "gain" i.e. a gain of 1. Pixels with leakage values less than 1 are assigned a gain greater than 1 to bring their post gain leakage in line with the average, those with leakage values greater than this will be given gains of less than 1. In the described embodiment, the gain value assigned to a pixel is the inverse of the gradient of the pixel's pixel mean to frame mean graph. Thus, a pixel having a gradient of 0.8 would be assigned a gain value of 1.25 to bring it into conformity with the normalized gain.

The gain values, gradients of the graphs, are calculated by line fitting a gradient to the pixel mean/frame mean data point. In this embodiment, line fitting is achieved by robust linear regression. Calibration gains for each pixel may then be stored in the detector 13 for use in gain compensation of collected charge values.

A second method is based on collecting charge values for bright frames. The average pixel ADC value is calculated for many frames, for example several thousand frames. The average of all the pixel averages is then calculated to obtain a bright frame mean. For each pixel the ratio of the frame mean to the pixel mean is calculated and stored as the pixel gain compensation value. Optionally, these values may be stored in detector 13.

In one embodiment, both methods are utilised in calibrating devices. The bright frame approach results in values which may reflect all aspects of the charge collection process, for example the charge transport properties of the detector, any mechanical defects in the bump or interface between ASIC and detector, and the variations in the pixel.

However, the dark leakage approach is not dependent on the charge transport properties of the detector. Consequently, the two gain factors provide complementary information. The leakage based gains may be used to check the bright frame gains; the summed overall discrepancy between the gains providing an indication of sensor quality.

The foregoing calibration methods provide for the compensation of pixel to pixel variations in sensitivity. This allows the output response from each pixel value to be treated in the same way in the read chain. Thus, the results from the detector are x,y position independent.

Inherent in the leakage based gains in the assumption that the device leakage is the same for every pixel the difference we perceive are due to capacitive differences.

Energy Compensation

The problem is that the charge induced and collected by in the ASIC has a non-linear relationship to the actual radiation dose. In general terms this has been solved by the applicant by breaking down the non-linear relationship.

There is a known empirical non-linear relationship between the exposure in terms of "air kerma" and the energy of the energy of the incoming photon. This non-linear relationship is embodied in the "mass energy transfer coefficient". Theoretically, the amount of charge released by a photo-electric interaction is directly proportional to the energy of the photon. In practice this relationship also is non-linear due to charge trapping, incomplete charge deposition, interaction depth for example. Therefore, embodiments of the invention treat these two non-linear relationships separately. That is to say, a "known" empirically deduced curve is derived from the NIST (National Institute for Standards and Technology) data and a separate sensor dependent relationship between induced charge and photon energy is derived. It is the derivation of this second relationship which the energy compensation portion of the calibration process is concerned with.

As outlined above the energy compensation problem is reduced to the problem of deriving a relationship between induced charge and photon energy. The end result which is required is that the calculated dose and dose rate are accurate and precise. The accuracy in this case is determined as referenced to known environmental dose rate at which empirical tests are conducted. This may be considered a typical radiation metrology calibration problem. In such cases the measuring instrument is placed in a known radiation flux. A number of experimental data are obtained. On this basis of the obtained data the instrument is adjusted to bring the measured response of the instrument in line with the known external environmental values.

Typically the optimisation parameters are adjusted to minimise (and sometimes maximise) an optimisation criterion or optimisation criteria.

The optimisation criterion to be minimised is the difference between the calculated dose (dose rate) and the actual known dose rate. From the experimental setup the actual dose rate is known. The shortest time period over which experimental data may be collected is a single frame, and each frame will contain several hits. This embodies the credit assignment problem, and the observed dose calculation is deconstructed in order to solve the problem.

As the observed dose is the result of several hits and each hit may be considered the result of a Poisson process, the observed dose rate results from a combinatorial Poisson process.

The model underlying the calibration comprises an ADC value to energy conversion, followed by an energy to dose conversion. The energy to dose curve is an empirical curve defined for a particular detector substrate type (calculated from NIST data). The ADC to energy curve is the curve that is fitted by the calibration process. The energy dose curve provides effectively provides a constraint mechanism to ensure that the final calibration is sensible from a device physics point of view. This curve is more generally referred to as constraint curve in the following description.

As seen from the general outline above, energy compensation calibration provides a conversion from observed charge values to radiation dose.

The dose per frame may be approximated as the sum of converted photon energies, and as charge collected in a frame is proportional to the photon energies the applicant has recognised that there is a functional relationship between the ADC value representative of the charge and the dose. Conversion data may be represented as a curve that provides for conversion between adc values to dose i.e. the functional relationship between adc dose e.g.

$$\text{Dose}_{frm} = \sum_{x,y} f_{cal}(adc) \quad (10)$$

Where $f_{cal}$ indicates the ADC to dose calibration curve, $\text{Dose}_{frm}$ denotes the cumulative dose for a frame, and adc denotes a vector which contains the ADC values for the current frame.

Finding this curve is a classic optimisation problem. In the described embodiment the ADC to dose curve may be defined by 32 energy level points. For each frame an optimisation problem is defined based around scaling the 32 values which define this space i.e. an optimisation problem based in 32 dimensional space is defined. This is done by defining a multiplication vector α, which is modified in order to minimise the relative differences between the calculated and observed dose rates. The a modified frame dose over plural frames is expressed as equation and the minimisation as expression (11) below.

$$D_{sum}(\alpha) = \sum_{fr} \sum_{i=1}^{n} f_{cal}^{0}(adc_{f,i} \mid \alpha) \quad (11)$$

$$\min_{\alpha} \sum \left( \frac{D_{act,fr} - D_{sum}(\alpha)}{D_{act,fr}} \right)$$

Where;—
1. $D_{sum}$ is the summed dose over several frames, and
2. $D_{act}$ is the actual dose.

Various standard optimisation algorithms are known. However, it has been found in practice that not all these solutions provide physically realistic solutions.

The error between the calculated and observed dose rates is to be minimised for over all the calibration data, which will be several hundred frames (and several thousand hits), obtained at different exposure times and fluency rates.

Optimisation

The above optimisation function, (11), can be represented in terms of what can be measured;—

$$E_f = \frac{1}{2} \sum_{i=1}^{n} (o_i - e_i)^2 \quad (12)$$

Where $E_f$=the observed dose for the f th frame;
$o_i$=the observed dose for the i th pixel; and
and $e_i$=the expected dose for the i th pixel.

The total error is defined as the sum of such error over all the frames observed, $$E_{tot} = \sum_{f=1}^{N} E_f \tag{13}$$

This frame based optimisation is directly equivalent to mapping the ADC probability density functions (pdfs) to the dose domain and minimising the difference between the actual dose (known from calibration setup) and the expected dose (e.g. the mean of the pdf).

$$E_{tot} = D_a - \sum_{adc=1}^{N} adc \cdot pdf(adc) \tag{14}$$

$$E_{tot} = D_a - D_e$$

As mentioned previously, a constraint curve is introduced in order to maintain a physically realistic solution. The ADC pdf is mapped through the ADC/constraint energy/dose curves to produce a dose pdf equivalent. If the ADC pdf is represented as a histogram each of the ADC bin ranges has an equivalent dose curve bin range.

The constraint curve is then adjusted, to map the observed ADC pdf to a require dose ADC, e.g. the constraint curve is adjusted to make the expected dose pdf (the mean of the mapped dose) coincident with the required actually observed dose. The mapping of the observed ADC pdf onto a dose pdf with the appropriate expected value results in a compound dose rate that will have the correct mean value.

The optimization scheme maps to a dose distribution with the correct mean. However, more complex mapping schemes can be used to map the observed ADC values onto dose distribution with a required distribution shape (as opposed to merely having the correct mean).

Calibration

How to "adjust" the constraint curve to map the ADC values to the dose domain is an important aspect of the calibration process. The adjusting is done via a weighting curve, which initially is set to unity. This weighting curve is iteratively updated, each step in the iterative process being intended to minimise the error as shown in equation (14). The final ADC to dose curve is produced by applying this weighting curve to the constraint curve thereby distorting the constraint curve as appropriate for the particular sensor under consideration.

The initial constrain curve is created using a theoretical energy to dose relationship, which is derived from the material properties for the detector substrate material, in the described embodiment CdTe, $$D_r(\Delta E) = \frac{\overline{E}_\gamma (\mu_{km}^{air}(\Delta E_\gamma)/\rho_{air})}{A \cdot (1 - e^{-\mu_{CdTe}(\Delta E_\gamma)t})} \phi(\Delta E_\gamma) \tag{15}$$

where:
$\Delta E_\gamma$ is the photon energy range, $\overline{E}_\gamma$ is the mean photon energy,
$\phi(\Delta E_\gamma)$ is the fluence for the photon energy range, $\Delta E_\gamma$,
$D_\gamma(\Delta E_\gamma)$ is the dose rate for the photon energy range, $\Delta E_\gamma$,
$\mu_{CdTe}(\Delta E_\gamma)$ the linear attenuation coefficient for CdTe for the photon energy range, $\Delta E_\gamma$ $\mu_{km}^{air}(\Delta E_\gamma)/\rho_{air}$, the mass energy transfer coefficient for CdTe for the photon energy range, $\Delta E_\gamma$, and $\rho_{air}$, denotes air density,
t, indicates detector thickness=0.07 cm
and, A is detector surface area=5×5 mm.

An example of the theoretical relationship between photon energy a dose is illustrated in FIG. 11.

However, once a sufficient body of instruments have been calibrated the average of all the ADC to dose curves may be used as the constraint curves. In this way the weighting curve can be seen as a modification of a standard calibration curve.

Standard transformation methods, for example as described in (Press et al, "Numerical Recipes in 'C'" show how to map a pdf via any functional relationship;

$y=f(x)$ into the y domain merely by the relationship;

$$p(y) = p(x)\left|\frac{dy}{dx}\right|$$

Where
$p^{(x)}$ denotes the probability of x,
$p^{(y)}$ denotes the probability of y, and $$\left|\frac{dy}{dx}\right|$$

the modulus of the instantaneous gradient at x.

Iterative Process

Each step in the iterative process proceeds as follows;—
1) Calculate the pdf's, p(adc), for the 3 calibration isotopes ($^{241}$Am, $^{137}$Cs, $^{60}$Co.
2) Produce a weighted version of each of these 3 pdfs, by multiplying the pdf value, corresponding to each adc value, by the gradient of the weighting curve i.e. using the standard transformation method
3) Similarly transform the weighted pdf s into the dose domain using the constraint curve.
4) Calculate the global error between the actual dose and the average of the dose pdf.
5) Back-propagate the error to adjust the weighting curve and repeat the process.

Back-Propagation of Error

Back-propagation of error is a gradient decent optimisation process, such as described by Rumulhart and Hinton [5]. A similar approach is utilised to propagate back the overall dose error and attribute this dose error to individual ADC values. In diagrammatic form steps 1-4 discussed above may be represented as illustrated in FIG. 12, where:
W(x) denotes the weighting curve; and
C(x) denotes the constraint curve.

The back-propagation utilizes an update rule to modify the weighting curve.

$$W_{n+1}(adc) = W_n(adc) + \eta \Delta \cdot W_n(adc) \tag{16}$$

where $$\Delta = \frac{\partial E_{tot}}{\partial W_n(adc)}$$

This is known as a delta update rule.

$$\frac{\partial E_{tot}}{\partial W_n(adc)} \tag{16}$$

is obtained by the chain rule, as described in [5].

Consequently, in step 5 each entry in the ADC weighting curve is updated using the above delta update rule expressed in equation (16). This process continues until the $E_{tot}$ falls below an acceptable e.g. <5% error. The values obtained for the ADC weighting curve are stored in memory 112, where they are used by microcontroller 110 in the energy compensation step of the read out chain process to convert the composite frame ADC values to a dose value.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention.

The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (OVD), tape, cassette solid-state memory. The computer program may be supplied from a remote source embodied in the communications medium such as an electronic signal, radio frequency carrier wave or optical carrier waves. Such carrier media are also envisaged as aspects of the present invention.

It will be appreciated that any of the application programs, or any other logical module, may be made up of more than one functional unit that may be distributed across more than one data processing apparatus. The one of the more than one data processing apparatus may or may not be in the same physical location or device.

In view of the foregoing description it will be evident to a person skilled in the art that various modifications may be made within the scope of the invention. For example, the pixellated array of contact pads or electrodes need not be square or rectangular, but may be formed in another arrangement such as concentric circles, spirals or a hexagon for example.

Additionally, charge circuitry 30 need not be driven in a raster pattern, but may be read-out in any suitable pattern an application of the invention or design parameters or constraints requires.

The exposure control need not be by way of a PID controller, but any other suitable target hunting or variation control mechanism.

The ADCs need not be formed in the FPGAs of the system modules, but may be separately formed.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a nonexclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

REFERENCES

[1] H. H. Barrett, J. D. Eskin and H. B. Barber, Phys. Rev. Lett. 75 156 (1995)
[2] J. D. Eskin, H. H. Barrett and H. B. Barber, J. Appl. Phys. 85 647 (1999)
[3] Glenn Knoll, Radiation Detection and Measurement, John Wiley & Sons, Inc. 1999
[4] Heikkinen, J. and Arjas, E. (1999). Modeling a Poisson forest in variable elevation: A nonparametric Bayesian approach, Biometrics 55: 738-745.
[5] D. E. Rumelhart, G. E. Hinton, R. J. Williams, Learning internal representations by error propagation, MIT Press Cambridge, Mass., USA

What is claimed is:
1. An apparatus for detecting high-energy radiation, the apparatus comprising:
 a detector substrate configured to generate charge in response to a radiation photon interaction event induced by high-energy incident radiation, said detector substrate comprising an array of high-energy radiation sense volumes; and
 a circuit substrate supporting an array of read-out circuits corresponding to said array of sense volumes and operative to collect charge from corresponding sense volumes, each of said read-out circuits including charge integration circuitry configured to integrate the collected charge, wherein said read-out circuits are automatically controllable in accordance with an exposure control signal to vary an exposure window duration to reduce the likelihood of a number of photon interaction events detected by said array of high-energy sense volumes exceeding at least one of:
- a single photon interaction event per high-energy radiation sense volume of said array of high-energy radiation sense volumes in an exposure window;
- a single photon interaction event per pair of adjacent high-energy sense volumes of said array of high-energy radiation sense volumes in an exposure window; and
- a single photon interaction event per high-energy radiation sense volume of said array of high-energy radiation sense volumes in successive exposure windows.

2. The apparatus of claim 1, wherein said exposure control signal is configured to decrease said exposure window duration for an increase in the number of photon interaction events detected by said array of high-energy sense volumes in a given time period.

3. The apparatus of claim 2, wherein said given time period is a current exposure time for said apparatus.

4. The apparatus of claim 1, wherein said exposure control signal is dependent on the temperature of said detector substrate.

5. The apparatus of claim 4, further comprising circuitry configured to determine said temperature by monitoring dark current leakage in said detector substrate.

6. The apparatus of claim 4, wherein said exposure control signal is configured to decrease said exposure window duration for an increase in said temperature of said detector substrate.

7. The apparatus of claim 4, comprising signal processing circuitry for configuring said exposure control signal in dependence on said number of photon interaction events detected by said array of high-energy sense volumes in a given time period.

8. The apparatus of claim 7, wherein said signal processing circuitry comprises calibration data for modifying a charge value derived from said read-out circuit in correspondence with a change in said temperature of said detector substrate.

* * * * *